L. KAHN.
Stem-Winding and Setting-Device for Watches.
No. 166,781.  Patented Aug. 17, 1875.
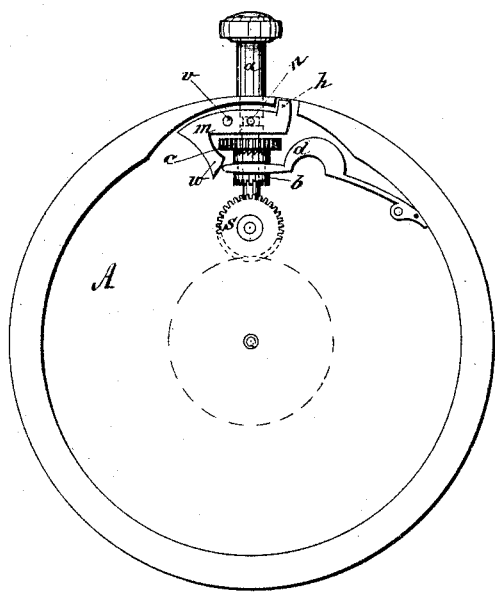
Witnesses.
Earle H. Smith
E. Schuler
Inventor.
Louis Kahn
per Henry E. Roeder
Attorney.

UNITED STATES PATENT OFFICE.

LOUIS KAHN, OF NEW YORK, N. Y.

IMPROVEMENT IN STEM WINDING AND SETTING DEVICES FOR WATCHES.

Specification forming part of Letters Patent No. 166,781, dated August 17, 1875; application filed April 13, 1875.

*To all whom it may concern:*

Be it known that I, LOUIS KAHN, of New York, in the State of New York, have invented a new and useful Improvement in Stem Winding and Setting the Hands of Watches, of which the following is a specification:

The nature of my invention consists in a single operating-lever, whereby, in combination with the stem, and with a crown-wheel and clutch, such lever, by an outward pull of the stem, not only moves the clutch and wheel to throw the winding mechanism out of gear, and the setting mechanism into gear, but also serves to hold it in that position as long as required, and the inward motion of the stem, by the same lever, moves the clutch and wheel in the opposite direction, and so restores the winding-gear connection. Said operating-lever is also provided with a projection or nose, arranged in such relation to the usual spring-catch for holding the case closed that the act of closing the case will operate the said lever by bringing the spring-catch in contact with the projection or nose thereof.

A is the plate or frame to which the movements of the watch are attached. $a$ is the stem, upon a square part of which a clutch, $b$, is fitted, provided at one end with teeth fitting into corresponding teeth in the side surface of the wheel $c$, and at its other end with teeth corresponding with and fitting into the teeth of the pinion $s$, turning on a fixed center, and meshing into a suitable wheel (not shown in the drawing except by dotted lines) fast to the stem to which the watch-hands are attached. This clutch is provided with a groove in its circumference, into which the spring-lever $d$ is made to fit, and by means of this spring-lever $d$ said clutch $b$ is held in gear with the wheel $c$, and clear of the teeth of the wheel or pinion $s$, or vice versa. These said parts are not substantially different from others now in use in a number of different stem-winding watches.

My improvement has for its object the simplifying of the mechanism for connecting and disconnecting the stem from and with the winding and setting mechanism, respectively; and it consists chiefly in a single lever, $m$, which is arranged to vibrate on a fixed center, $v$, fast to the plate A, and provided with an inclined or cam projection, $w$, at one end close to the end of the spring-lever $d$. Said lever $m$ also has a projection or nose, $h$, at its opposite end, passing through an opening in and projecting beyond the rim of the plate A, the office of which will presently appear. This lever $m$ is connected with the stem $a$ through a pin, $n$, working in a suitable groove in the circumference of the stem $a$, and receives thereby the desired motion whenever the stem $a$ is moved inward or outward. When the stem $a$ is pulled outward, the same will act upon the lever $m$ by means of the pin $n$, in such a manner that the inclined portion of the projection $w$ will operate the spring-lever $d$, so as to move the clutch $b$ inward clear of the teeth in the wheel $c$, and bring the teeth of the crown-wheel $x$ at its inner end in gear with the teeth in the pinion $s$, and, falling into a step in the end of lever $d$, holds it in this position, when, by the turning of the stem $a$, the desired amount of motion may be given to the pinion $s$, to be communicated through suitable gearing to and for setting the hands of the watch. When the stem $a$ is pushed inward the end of the lever $m$ slips off from the spring-lever $d$ by the movement of the lever $m$, when the spring action of said lever $d$ moves the clutch outward, so that the teeth of crown-wheel $x$ will come clear and out of the teeth of the pinion $s$ to prevent any further movement of the hands of the watch. The movement of the lever $m$, when the stem $a$ is pulled outward for the purpose of operating the hands of the watch, also causes the projection or nose $h$ to project outside of the circumference of the plate A close against the spring situated in the watch-case, and which said spring keeps the cover of the watch-case closed. If, after having regulated and moved the hands, it should be forgotten to throw the same out of gear with the pinion $s$ by pulling the stem outward, then the closing of the cover, through which its spring will receive an inward motion, will cause this movement of its spring-catch to act upon the still projecting nose $h$, pushing the same inward, thereby moving the lever $m$, and thereby consequently cause the clutch $b$ to be brought out of gear of the teeth of the pinion $s$, and prevent thereby any further motion being given to the hands of the watch.

From the foregoing description it will be seen that by combining a single lever with a few of the parts common to stem-winding watches I effect the connection and disconnection of the winding and setting mechanism with and from the stem, or the shaft $a$ therein, in a very simple manner.

What I claim as my invention, and desire to secure by Letters Patent, is—

The double-armed lever, pivoted as described, and provided at its extremities with the projections $w$ and $h$, substantially as specified.

LOUIS KAHN.

Witnesses:
JACOB DU BOIS,
EARLE H. SMITH.